United States Patent [19]

Turner et al.

[11] 3,869,458

[45] Mar. 4, 1975

[54] 3'-O-ACETYL-18'-GLYCYRRHETYL-N-CARBOETHOXY PIPERAZINOAMIDES

[75] Inventors: John Cameron Turner, West Wickham; Rosalind Po Kuen Chan, London, both of England

[73] Assignee: Biorex Laboratories, Limited, London, England

[22] Filed: July 8, 1970

[21] Appl. No.: 53,322

[30] Foreign Application Priority Data

July 28, 1969 Great Britain.................... 37692/69

[52] U.S. Cl. .... 260/268 PC, 260/239 B, 260/243 B, 260/247.2 A, 260/268 C, 260/557 B, 424/250
[51] Int. Cl............................................ C07d 51/70
[58] Field of Search................... 260/268 C, 268 PC

[56] References Cited

UNITED STATES PATENTS

| | | | |
|---|---|---|---|
| 3,102,119 | 8/1963 | Knox.............................. | 260/268 PC |
| 3,153,644 | 10/1964 | Axer.............................. | 260/268 PC |
| 3,153,645 | 10/1964 | Axer.............................. | 260/268 PC |

*Primary Examiner*—Donald G. Daus
*Attorney, Agent, or Firm*—Wenderoth, Lind & Ponack

[57] ABSTRACT

New amide derivatives of glycyrrhetinic acid and of 3-O-acyl-glycyrrhetinic acid are provided in which the amide grouping is derived from piperazine or from an N-carboalkoxy-piperazine. The new compounds are valuable in the treatment of inflammatory conditions and especially of arthritic conditions.

2 Claims, No Drawings

3'-O-ACETYL-18'-GLYCYRRHETYL-N-CARBOETHOXY PIPERAZINOAMIDES

BACKGROUND OF INVENTION

In U.S. Pat. No. 3,412,084, there are disclosed, inter alia, compounds of the general formula:

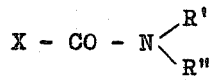

wherein R' and R", which may be the same or different, are hydrogen atoms or unsubstituted or substituted alkyl, cycloalkyl, aralkyl or aryl radicals or can be joined together to form, with the nitrogen atom to which they are attached, a heterocyclic radical, which may contain further hetero atoms, such as nitrogen, oxygen and sulphur atoms, and which may be substituted, and X is the residue of glycyrrhetinic acid, the hydroxyl group of which may be acylated with a mono- or polycarboxylic acid. When R' and R" are joined to form a ring, this ring preferably contains 4 – 8 carbon atoms and possibly also a sulphur, oxygen or nitrogen atom or an alkyl-substituted nitrogen atom, for example, a heptamethylene-imide, piperazine, N-methyl piperazine or morpholine ring. Specific examples are given of compounds which contain an N-methylpiperazinyl radical and a free or acylated 3-hydroxy group in the glycyrrhetinic acid residue. There is also an example of a compound which contains an unsubstituted piperazinyl radical and an acetylated 3-hydroxy group in the glycyrrhetinic acid residue. The compounds disclosed in this United States Specification can be used for the treatment of inflammatory conditions, such as simple and acute inflammations, inflammations of joints due to arthritis and the like, traumatic inflammation, etc.

One of the most serious conditions in arthritis is the formation of secondary lesions and we have found that the compounds disclosed in the above-mentioned U.S. Patent do not have a significant effect on such secondary lesions. In view of the wide occurrence of arthritic diseases, there is, therefore, a need for compounds which not only alleviate and cure arthritis but are also effective in the treatment of secondary lesions associated with arthritis.

SUMMARY OF THE INVENTION

It is an object of the present invention to provide new derivatives of glycyrrhetinic acid which can be used for the treatment of arthritic conditions and which are also useful in the alleviation of secondary lesions associated with arthritis.

The new compounds according to the present invention have the general formula:

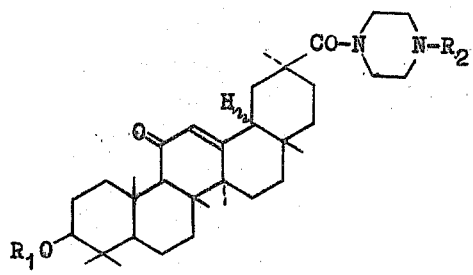

wherein $R_1$ is a hydrogen atom or the acyl residue of a monocarboxylic acid and $R_2$ is a carboalkoxy radical or wherein $R_1$ and $R_2$ are both hydrogen atoms; and the acid-addition salts of the compounds in which $R_2$ is a hydrogen atom.

When $R_1$ is an acyl radical, this is preferably derived from an aliphatic monocarboxylic acid containing up to 6 carbon atoms, such as acetic acid, propionic acid, butyric acid, isobutyric acid, malic acid, succinic acid, citric acid, tartaric acid, a valeric acid or a caproic acid.

When $R_2$ is a carboalkoxy radical, the alkoxy grouping preferably contains up to 6 carbon atoms, for example, methoxy, ethoxy, n-propoxy, isopropoxy, n-pentoxy or n-hexoxy.

The new compounds according to the present invention can be prepared by reacting an acid halide of the general formula:

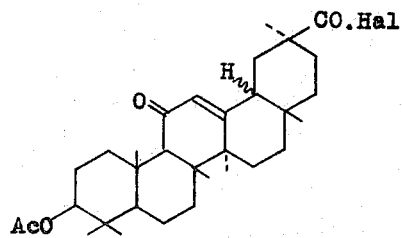

in which Hal is a halogen atom, preferably a chlorine atom, and Ac is the residue of a monocarboxylic acid, with an N-carboalkoxy-piperazine under mild basic conditions to give a 3'-O-acyl-glycyrrhetyl-N-carboalkoxy-piperazinamide which, if desired, can be subjected to alkaline hydrolysis.

When the alkaline hydrolysis is carried out under mild conditions, there is obtained the corresponding 3-hydroxy compounds, i.e., the acyloxy radical (AcO) is replaced by a hydroxyl group. When using more severe conditions, not only is the acyloxy radical replaced by a hydroxyl group but the N-carboalkoxy-piperazinyl radical is converted into a piperazinyl radical.

If desired, the piperazine derivative can be reacted with a non-toxic inorganic or organic acid to give the corresponding acid-addition salt.

The N-carboalkoxy-piperazines used as starting materials can be prepared in the manner described by Moore et al. (J.C.S., 1929, 39).

The following Examples are given for the purpose of illustrating the present invention:

EXAMPLE 1

7 g. N-carboethoxy piperazine were added, while stirring, to a solution of 21.2 g. (0.004 mole) 3-O-acetyl-18β-glycyrrhetyl chloride in 500 ml. benzene. The solution was rendered weakly alkaline (pH ~ 8) by the addition of methanolic potassium hydroxide and stirring continued for 0.5 hours. After washing with dilute acid and water, the solution was dried and evaporated. The residue obtained was crystallised from ether to give 23.5 g. (90 % of theory) 3'-O-acetyl-18β'-glycyrrhetyl-N-carboethoxy-piperazinamide in the form of needles with a melting point of 218° – 220°C.; $[\alpha]_D^{20} = +124°$ ($c = 1$ in chloroform).

In the same manner, there can be prepared 3'-O-acetyl-18α'-glycyrrhetyl-N-carboethoxy-piperazinamide (m.p. 248° – 250°C.; $[\alpha]_D^{20} = + 53°$ ($c$ = 1 in chloroform); 3'-O-propionyl-18α'-glycyrrhetyl-N-carbomethoxy-piperazinamide; 3'-O-caproyl-18α'-glycyrrhetyl-N-carbo-n-butoxy-piperazinamide; and 3'-O-acetyl-18α'-glycyrrhetyl-N-carbohexoxy-piperazinamide, as well as the corresponding 18β'-compounds.

EXAMPLE 2

35 g. 3'-O-acetyl-18β'-glycyrrhetyl-N-carboethoxy-piperazinamide were heated under reflux for 5 hours in 15 percent ethanolic potassium hydroxide. The solution was then cooled, diluted with water and concentrated. The concentrate was thereafter extracted with chloroform and the extract evaporated to give a gum which was treated with dry hydrogen chloride in acetone solution. The precipitate formed was repeatedly recrystallised from methanol-chloroform to give 15 g. 18β'-glycyrrhetyl-piperazinamide hydrochloride in the form of needles with a melting point of 347° – 349°C.; $[\alpha]_D^{20} = + 66°$ ($c = 1$ in chloroform-methanol (1:1).

EXAMPLE 3

20 g. 3'-O-acetyl-18β-glycyrrhetyl-N-carboethoxy-piperazinamide were mixed with 1 litre ethanol and 200 ml. 5 percent aqueous sodium hydroxide solution. After heating the reaction mixture on a steam bath for 30 minutes, the reaction was shown to be completed by thin layer chromatography. The reaction mixture was then diluted with water and extracted with dichloromethane. The organic extract was thoroughly washed with water and with an aqueous solution of sodium chloride and then dried over anhydrous magnesium sulphate. After removing the solvent, there was obtained an almost colourless gum which was recrystallised from ether to give 9.5 g. 18β'-glycyrrhetyl-N-carboethoxy-piperazinamide in the form of white crystals with a melting point of 236° – 238°C.; $[\alpha]_D^{20} = + 131°$ ($c = 1$ in chloroform).

In the same manner, there can be prepared 18α'-glycyrrhetyl-N-carboethoxy-piperazinamide (m.p. 245° – 146°C.; $[\alpha]_D^{20} = + 49°$ ($c = 1$ in chloroform); 18α'-glycyrrhetyl-N-carbomethoxy-piperazinamide; 18α'-glycyrrhetyl-N-carbo-n-butoxy-piperazinamide and 18-α'-glycyrrhetyl-N-carbohexoxy-piperazinamide, as well as the corresponding 18β'-compounds.

The present invention also includes within its scope pharmaceutical compositions containing the new glycyrrhetinic acid derivatives. These pharmaceutical compositions can be administered orally, rectally or parenterally in admixture with a solid or liquid pharmaceutical carrier.

Solid compositions for oral administration include compressed tablets, pills, dispersible powders and granules. In such solid compositions, one of the new derivatives is admixed with at least one inert diluent, such as calcium carbonate, starch, alginic acid or lactose. Solid compositions for rectal administration can be made by mixing the active materials with conventional suppository bases. The solid compositions may also comprise, as is normal practice, additional substances other than inert diluents, for example, lubricating agents, such as magnesium stearate.

Liquid compositions for oral administration include pharmaceutically acceptable emulsions, solutions, suspensions, syrups and elixirs containing inert diluents commonly used in the art, such as water and liquid paraffin. Besides inert diluents, such compositions may also comprise adjuvants, such as wetting and suspension agents and sweetening and flavouring agents.

The compositions according to the present invention, for oral administration, include capsule of absorbable material, such as gelatine, containing one of the new derivatives, with or without the addition of diluents or excipients.

Preparations according to the present invention for parenteral administration include sterile aqueous or non-aqueous solutions, suspensions or emulsions. Examples of non-aqueous solvents or suspending media include propylene glycol, polyethylene glycol, vegetable oils, such as olive oil, and injectable organic esters, such as ethyl oleate. These compositions may also contain adjuvants, such as wetting, emulsifying and dispersing agents. They may be sterilised, for example, by filtration through bacteria-retaining filters, by incorporation into the compositions of sterilising agents, by irradiation or by heating. They may also be produced in the form of sterile solid compositions, which can be dissolved in sterile water or some other sterile injectable medium immediately before use.

The percentage of active material in the compositions of the present invention may be varied, it being necessary that it should constitute a proportion such that a suitable dosage for the desired therapeutic effect shall be obtained. In general, the preparations of the present invention should be administered orally, rectally or parenterally to give 25 to 100 mg. of active substances per day. Parenteral administration can be, for example, by the intramuscular, intravenous or intrabursal routes.

The following Examples illustrate pharmaceutical compositions according to the present invention:

EXAMPLE 4

500 mg. tablets are prepared containing:

| | |
|---|---|
| 18β'-glycyrrhetyl-piperazinamide hydrochloride | 250 mg. |
| starch | 150 mg. |
| lactose | 95 mg. |
| magnesium stearate | 5 mg. |

EXAMPLE 5

500 mg. tablets are prepared containing:

| | |
|---|---|
| 3'-O-acetyl-18β'-glycyrrhetyl-N-carboethoxy-piperazinamide | 300 mg. |
| starch | 180 mg. |
| magnesium stearate | 20 mg. |

The compositions described in the two above Examples 4 and 5 are intended for oral administration to humans for the alleviation and treatment of arthritic conditions.

We claim:
1. 3'-O-acetyl-18β'-glycyrrhetyl-N-carboethoxy-piperazinamide.
2. 3'-O-acetyl-18α'-glycyrrhetyl-N-carboethoxy-piperazinamide.

* * * * *